June 2, 1970  W. J. TABOR  3,515,456

OPTICAL READOUT IMPLEMENTATION

Filed Aug. 31, 1967

INVENTOR
W. J. TABOR
BY Herbert M. Shapiro
ATTORNEY

United States Patent Office 3,515,456
Patented June 2, 1970

3,515,456
OPTICAL READOUT IMPLEMENTATION
William J. Tabor, New Providence, N.J., assignor to Bell Telephone Laboratories, Incorporated, Murray Hill and Berkeley Heights, N.J., a corporation of New York
Filed Aug. 31, 1967, Ser. No. 664,780
Int. Cl. G02f 1/22
U.S. Cl. 350—151            5 Claims

ABSTRACT OF THE DISCLOSURE

The presence and absence of a single wall domain in a magnetic sheet can be detected by Faraday rotation. The contrast between the light transmitted through the sheet when a domain is present as compared to that transmitted when a domain is absent is maximized, in accordance with this invention, when the thickness T of the sheet of material is selected such that $$T = \left(n + \frac{1}{2}\right)\delta$$

where $\delta$ is the thickness for providing $2\pi$ retardation between the $a$ and $b$ directions of the polarization vector of the light and $n$ is a whole number.

FIELD OF THE INVENTION

This invention relates to magnetic devices capable of being read out optically by means of Faraday rotation.

BACKGROUND OF THE INVENTION

Magnetic devices such as single wall domain devices of the type described in copending application Ser. No. 579,931, filed Sept. 16, 1966, for A. H. Bobeck, U. F. Gianola, R. C. Sherwood, and W. Shockley, now Pat. 3,460,116, issued Aug. 5, 1969, are particularly well adapted for optical readout. That is to say, the presence and absence of a single wall domain at an output position in a sheet of a material in which single wall domains can be moved may be indicated by optical means.

Both the Kerr effect and the Faraday effect may be employed, generally, for detecting the domains optically. By use of appropriate analyzers, reflected light in the first instance, and transmitted light in the second, indicates the presence of a domain in the output position. The absence (or low level) of light indicates the absence of a domain. The presence of light may be taken as representative of a binary one; and absence of light may be taken as representative of a binary zero. We are concerned only with the Faraday effect here.

The rare earch orthoferrites are representative of a wide class of materials useful for making sheets in which single wall domains can be moved. Most of these materials are birefringent.

Applicant has found that birefringent materials in which single wall domains can be moved can be formed into sheets the thicknesses of which are important parameters in determining the contrast between light transmitted through an output position when a domain is present as compared to light transmitted when a domain is absent. Specifically, the thickness T of such a sheet may be chosen to provide maximum contrast when $$T = \left(n + \frac{1}{2}\right)\delta$$

where $\delta$ is the sheet thickness for providing $2\pi$ retardation between the $a$ and $b$ directions of the polarization vector of interrogating light of wavelength $\lambda$.

DETAILED DESCRIPTION

Figure 1:
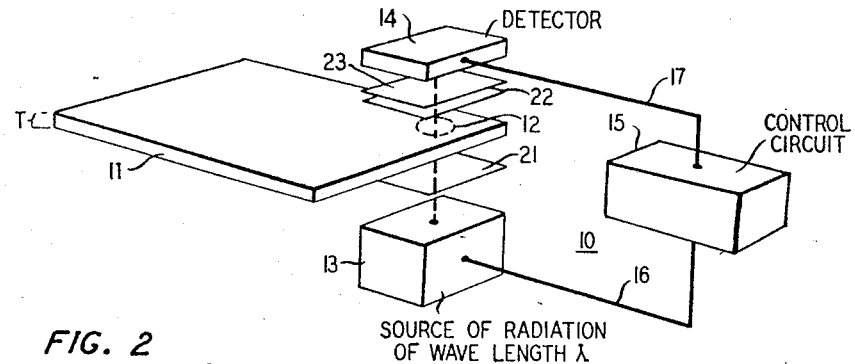
FIG. 1 shows a schematic illustration of an arrangement including a sheet of magnetic material in which a single wall can be moved and an optical readout means operative on a Faraday rotation principle.

FIG. 1 shows a memory arrangement 10 adapted to optical readout in accordance with this invention. The arrangement comprises a magnetic sheet 11 which is conveniently a rare earth orthoferrite. Single wall domains are provided in such sheets and moved controllably therein as disclosed in the above-mentioned copending application.

We are concerned primarily with the readout implementation here. Accordingly, the means for providing domains initially and for moving those domains in the magnetic sheet are not shown. It may be assumed that such means are present and enable the present and absence of domains to be provided controllably at an output position 12 in FIG. 1.

Faraday rotation is employed to detect the presence and absence of domains in output position 12. To this end, a source 13 of radiation of wavelength $\lambda$, conveniently a laser, is positioned to direct radiation at output position 12. A detector 14 is positioned to detect radiation which passes sheet 11 at position 12. Source 13 and detector 14 are connected to a control circuit 15 via conductors 16 and 17, respectively.

Figure 2:
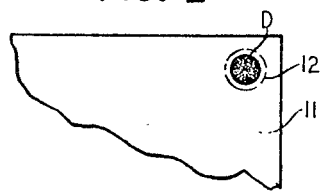
FIG. 2 shows the output portion of the arrangement of FIG. 1 with a single wall domain present.

In FIG. 1, the output position is represented by a broken closed line (12). No domain is present within the area enclosed by that line. FIG. 2 shows the output position occupied by a domain D shown as a blackened circle. Light from source 13 of FIG. 1 provides a relatively low output pulse $P_o$ in detector 14 when a domain is absent and a relatively high output pulse $P_l$ when a domain is present in output position 12 as indicated in FIG. 3.

Figure 3:
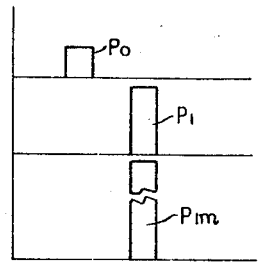
FIG. 3 is a pulse diagram illustrating the outputs detected for sheets of selected thicknesses in response to an interrogating light beam transmitted through the output portion of FIG. 1.

It has been found that if sheet 11 is of a thickness prescribed in accordance with this invention, pulse $P_l$ may be made large as indicated by the pulse $P_{lm}$ in FIG. 3. If care is not exercised in the selection of a sheet thickness, light passing through the output position when a domain is present may also be extinguished and pulse $P_l$ will not be detectable.

Figure 4:
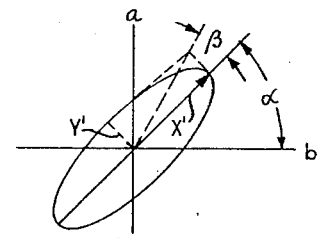
FIGS. 4, 6, and 7 are geometric representations of polarization vectors in accordance with this invention.

An understanding of the principles of this invention is obtained from a physical model. Assume polarized light is directed at a birefringent crystal so that the direction of the polarization vector is at some angle $\alpha$ to the crystallographic axes $a$ and $b$ as shown in FIG. 4. The light then has a component along each axis. If, in addition, a magnetic field is present in the crystal, each component is rotated, each component in turn having components along each axis.

Figure 5:
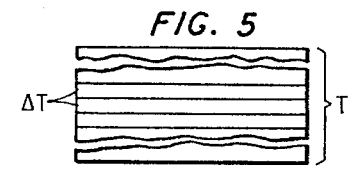
FIG. 5 is a view of the sheet of magnetic material of FIG. 1 showing the sheet divided into imaginary planes in accordance with an assumed model.

If the crystal is taken as comprising a number of planes of incremental thickness ($\Delta T$) as shown in FIG. 5, then each consecutive plane may be thought of as having each component of light from the next preceding plane transmitted therethrough. Each plane rotates each of those components. Again, each component, so rotated, gives rise to an additional pair of components, one alone each axis.

Each plane is associated with a birefringence. It is convenient to express the effect of the birefringence of each plane as a phase change or retardation of one component with respect to the other of a pair. This enables us to ignore, for the moment, the nonretarded component, say along the $a$ axis, and to direct our attention to that component, say along the $b$ axis, which is retarded.

Figure 6:
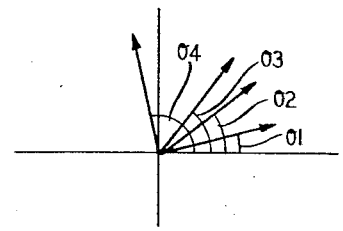

The effect of consecutive planes on the retarded components may be represented as radius vectors at consecutive phase angles $\theta 1$, $\theta 2$, $\theta 3$, . . . as shown in FIG. 6. The angles enable us to "weight" the various vectors to reflect the birefringence factor. Such vectors, accordingly, add to provide an ever increasing resultant along the $b$ axis as long as the phase angle defined by any particular radius vector does not exceed 180 degrees. If the angle does exceed 180 degrees, the corresponding radius vector is in a direction which diminishes the resultant.

Maximum contrast in accordance with this invention is met by maximizing the resultant of the radius vectors. The contrast to be maximized is the difference in light passed by a reverse magnetized domain at an output position in a magnetic sheet as compared to light passed when a domain is absent there. The magnetization of a domain is reversed from that of the remainder of the sheet. Accordingly, the effect of consecutive (incremental) planes in the sheet is to rotate the components one way, say clockwise, when a domain is present and the other way when a domain is absent.

Figure 7:
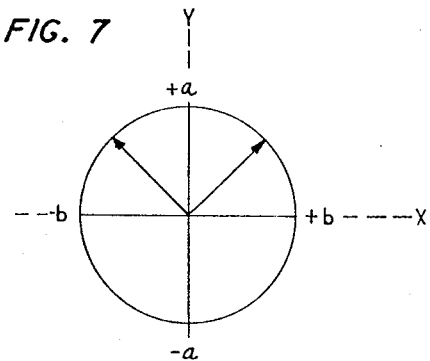

FIG. 7 shows an imaginary circle where the $a$ axis of the crystal is taken to be along the $y$ axis and the $b$ axis is taken along the $x$ axis. The sum of the nonretarded components of the transmitted light may be thought of as aligned along the $+a$ axis, and the sum of the retarded components may be thought of as aligned along the $+b$ and $-b$ axes for the cases when a domain is present and a domain is absent respectively. The resultant ($a$ and $b$) in each instance may be expressed as a radius vector in the first or in the second quadrant (because of the opposite magnetizations) and the angles which each of those resultants make the $+a$ axis are to be maximized for maximum contrast. Consequently, the $b$ component of each of those resultants is to be maximized and, therefore, the sum of the retarded components as light passes consecutive (incremental) planes in the sheet is to be maximized. But that $b$ component is increasing only so long as the radius vectors of FIG. 4 are not retarded in excess of 180 ($\pi$) degrees. Accordingly, the thickness of sheet 11 of FIG. 1 is chosen such that the radius vector associated with the last incremental element of thickness causes a phase retardation of about 180 degrees. It should be understood that if the thickness is chosen such that the last incremental element defines an angle of 360 ($2\pi$) degrees, Faraday rotation provides no contrast at all.

The mathematics may be understood in connection with FIG. 4. We assume, for simplicity, that incident light has a polarization vector along the $a$ axis. This may be insured by polarizer 21 of FIG. 1 if a laser is not used as source 13. The optical output can be characterized as an ellipse whose major axis makes an angle $\alpha$ with the $x$ axis and whose shape is determined by $$\beta = \frac{y'}{x'}$$

where $x'$ and $y'$ are the semi-major and semi-minor axes of the ellipse. $\alpha$ and $\beta$ can be calculated from $$\alpha = \frac{\Phi \delta}{2\pi T} \sin \frac{2\pi T}{\delta}$$

$$\beta = \frac{\Phi \delta}{2\pi T} \left(1 - \cos \frac{2\pi T}{\delta}\right)$$

where $T$ is the thickness of the material, $\delta$ is the thickness of the material that would have $2\pi$ retardation, and $\Phi$ is a (rotational) parameter related to the Faraday rotation of the material. These formulae are entirely valid only for small values of $\Phi$, for materials that show negligible dichroism, and for monochromatic light.

If the sense of magnetization is switched, then $\Phi$ changes sign.

If the polarized light is incident onto the $b$ axis of the crystal then $\delta$ changes sign.

The above formulae can be derived from a basic understanding of the Faraday effect and of the effects of birefringence. The parameters $\delta$, $\Phi$ are functions of the wavelength.

The foregoing results indicate that if a thickness $T$ was chosen such that $$\frac{2\pi T}{\delta} = n2\pi$$

$$T = n\delta$$

then both $\alpha$ and $\beta$ are zero and there is no contrast between the two senses of magnetization. This statement is entirely true only for monochromatic light; in white light there will generally be some contrast at some of the wavelengths.

The maximum contrast is detected by the use of an analyzer 22 plus a quarter wave plate 23 in the light path after the orthoferrite as shown in FIG. 1. These elements operate in a conventional manner to rotate light, passed when a domain is absent, to an orientation which is extinguished by the analyzer. The maximum contrast is obtained from $$T = \left(n + \frac{1}{2}\right)\delta$$

Since there is no contrast at $T=n\delta$, the thickness change from maximum to zero contrast is given by:

$$\Delta T = \left(n + \frac{1}{2}\right)\delta - n\delta = \frac{1}{2}\delta$$

In measurements on yttrium orthoferrite $\delta \sim 0.2$ mil which means that $\Delta T \sim .1$ mil. The tolerance on the material thickness is a small part of $\Delta T$, about .010 mil.

In several examples yttrium orthoferrite sheets having thicknesses measured in terms of retardation or $17\pi$ or $\sim 1.7$ mils in accordance with this invention provide the following results. Domains 4.0 mils in diameter are moved selectively to output positions. One milliwatt light of wavelength 6328 A. from a He:Ne laser source directed at the output position comprises the interrogating beam. A quarter wave plate and an analyzer are used. When a domain is absent a light of negligible intensity is detected. When a domain is present, a light of 4 microwatts intensity is detected. For comparison, an yttrium orthoferrite sheet having a thickness of $16\pi$ or $\sim 1.6$ mils to provide minimum transmission enables only negligible light to be detected whether a domain is present or absent.

Also, a wedge-shaped piece of orthoferrite was exposed to (polarized) He:Ne laser light and observed by means of a quarter wave plate and analyzer. It was clearly demonstrated that at thicknesses (measured in terms of retardation) of $2n\pi$ negligible contrast occurred whereas at thicknesses of $$\left(n + \frac{1}{2}\right)(2\pi)$$

maximum contrast occurred, in accordance with the theoretical expressions given above.

What has been described is considered only illustrative of the principles of this invention. Accordingly, various modifications may be made therein by one skilled in the art without departing from the scope and spirit of the invention.

What is claimed is:

1. A combination comprising a sheet of birefringent magnetic material including magnetic domains, means for directing at a selected position in said sheet electromognetic radiation approximately of wavelength λ, and means for detecting the passage of said radiation through said sheet at said selected position, said combination being characterized in that said sheet has a thickness T substantially equal to $$\left(n+\frac{1}{2}\right)\delta$$

where δ is the thickness of the sheet for $2\pi$ retardation of radiation of wavelength λ and $n$ is a whole number.

2. A combination comprising a sheet of birefringent magnetic material in which single wall domains can be moved in response to propagation fields from input to output positions, means for directing at said output positions polarized electromagnetic radiation approximately of wavelength λ, and means for detecting the passage of said radiation through said sheet at said output position, said combination being characterized in that said sheet has a thickness T determined by $$T=\left(n+\frac{1}{2}\right)\delta$$

where δ is the thickness of the sheet for $2\pi$ retardation of radiation of wavelength λ and $n$ is a whole number.

3. A combination in accordance with claim 2 wherein said sheet comprises a substantially single crystal having first and second axes in the sheet and said radiation includes a polarization vector substantially aligned with one of said first and second axes.

4. A combination in accordance with claim 3 wherein said sheet comprises a single crystal rare earth orthoferrite.

5. A combination in accordance with claim 2 wherein said radiation comprises essentially monochromatic light.

References Cited

UNITED STATES PATENTS

| | | | |
|---|---|---|---|
| 2,919,432 | 12/1959 | Broadbent | 340—174 |
| 3,059,538 | 10/1962 | Sherwood et al. | 350—151 |
| 3,142,720 | 7/1964 | Adams. | |
| 3,427,092 | 2/1969 | Smith | 350—151 |

OTHER REFERENCES

Wieder, IBM Tech. Disc. Bulletin, vol. 8, No. 8, January 1966.

PAUL R. GILLIAM, Primary Examiner

U.S. Cl. X.R.:
350—157, 161